No. 637,029. Patented Nov. 14, 1899.
J. F. PHILLIPS.
PROCESS OF SEPARATING GERM FROM CORN.
(Application filed July 22, 1899.)
(No Model.)
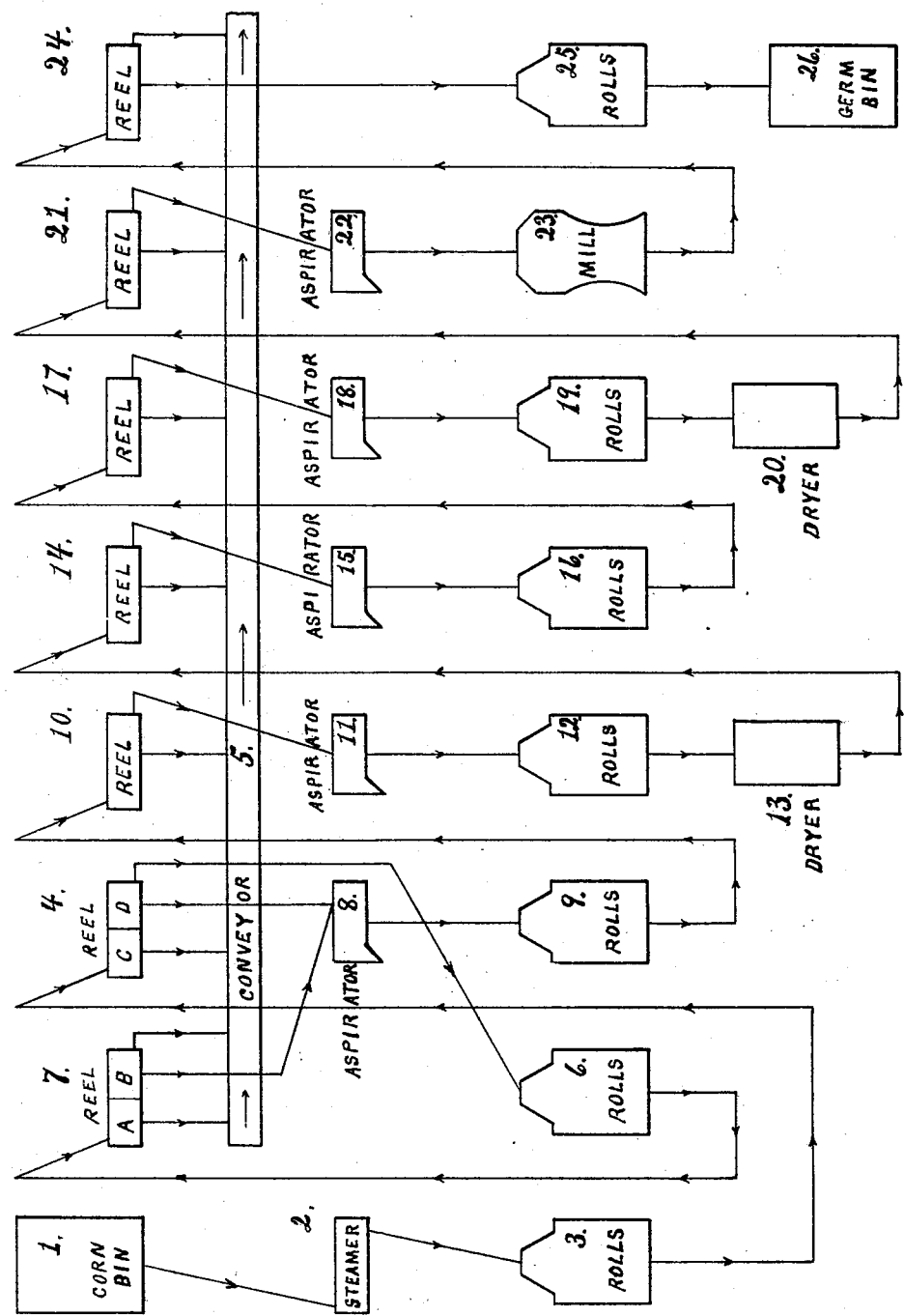
WITNESSES
A. S. Phillips
Fred Anschutz
INVENTOR.
John Fletcher Phillips
BY Jno. W. Lockhart,
ATTORNEY.

UNITED STATES PATENT OFFICE.

JOHN FLETCHER PHILLIPS, OF PEORIA, ILLINOIS, ASSIGNOR OF ONE-HALF TO HELEN MAR McLANE, OF KANSAS CITY, MISSOURI.

PROCESS OF SEPARATING GERM FROM CORN.

SPECIFICATION forming part of Letters Patent No. 637,029, dated November 14, 1899.

Application filed July 22, 1899. Serial No. 724,831. (No specimens.)

*To all whom it may concern:*

Be it known that I, JOHN FLETCHER PHILLIPS, a citizen of the United States, residing at Peoria, in the county of Peoria and State of Illinois, have invented a certain new and useful Process of Separating the Germ from Corn, of which the following is a specification.

In my process the object is to completely separate the germ which contains the oil so prejudicial to the distilling art and the starch-making art from the starch granules by a dry method, producing both germ and starch meal in a finished condition, each practically free from the other, and in a state suitable to be used in the various arts to which dry starch-meal and germ-meal are applicable.

My process is closely related to that particular branch of cornmeal-making wherein the gluten and starch are incompletely separated from each other and form two products, one being composed mostly of gluten and the other almost wholly of starch granules.

The various operations and machines used in my process are used in the art of milling and are so well known to those familiar with that art that I deem it unnecessary to describe either minutely. Any make of machine having the features, speed, and speed ratio described herein may be used.

In the accompanying drawing, 1 represents a bin for holding shelled corn; 2, a grain-steamer; 3, 6, 9, 12, 16, 19, and 25, roller-mills; 4, 7, 10, 14, 17, 21, and 24, reels or bolts; 13 and 20, driers; 23, a mill and 26 a bin for the finished corn germ.

The mode of practicing my invention is as follows: The shelled corn stored in the corn-bin 1 is conveyed to the steamer 2, where it is softened by steaming until the hulls separate easily from the body of the grain. The amount of steaming depends upon the condition of the corn, more steaming being required for old and dry corn than for new corn. The steaming should not be sufficient to saturate the grain and cause the ground particles to adhere in masses, but should leave them only in a damp state. The temperature may vary, but must be kept below the cooking-point of the grain. This operation of my process requires the same condition as that used in several branches of the art of milling, as in hominy-making, where the corn in some systems is steamed before grinding or cutting and in others after the grinding or cutting. I deem this explanation sufficient to enable any one familiar with steaming grain to perform this operation successfully in my process. The absorption of moisture tends to raise the germ out of its seat, to toughen it, and to cause it to separate more easily from the flinty starch particles surrounding it. The moisture absorbed by the starch particles prevents their absorbing oil from the germ when the grain is crushed or ground in the operations that follow the steaming. The oily germ particles cling together, while the moist starch particles adhere to their kind and abhor the germ granules. From the steamer 2 the corn is conveyed to the first stand of rolls or roller-mill 3, having rolls of four corrugations to the inch, a spiral of one inch, and a ratio of speed of three to one. The corn after being crushed in this mill is conveyed to a reel 4, having two screens of different-sized mesh, the first or "head" C having ten meshes to the inch and the second or "tail" D having four meshes to the inch. Three separations are made in this reel. The powder and small starch particles pass through the head or ten-mesh screen and into a conveyer 5. The residue passes onto the four-mesh screen, and the finer particles passing through the screen are conveyed into an aspirator 8, while the tailings are conveyed into a second stand of rolls 6, with a corrugation of eight to the inch, a spiral of one inch, and a ratio of speed of three to one. They then pass to a reel 7, clothed with two screens—the first or head A twelve meshes and the second or tail B six meshes to the inch. The germ particles adhere in masses too large to pass through the head screen; but the finer particles of starch or corn meal readily pass through into the conveyer 5. The residue passes onto the tail screen, and the germ and starch particles passing through it are conveyed into the aspirator 8, mixing with the stock from the tail screen of the reel 4, while the tailings, consisting of large particles of bran, with some adhering starch-grains, pass into the conveyer 5. In the aspirator 8 the small free bran and other light particles are carried away or separated from the heavier particles of stock. The latter is conveyed to the third roller-mill 9, having rolls with eight corrugations to the inch, spirals of one inch, and a ratio of speed of three to one. The product is further ground in passing through this mill and is conveyed to the third reel 10, having a ten-mesh screen, where the finer starch particles of the grain are separated out into the conveyer 5 from the adhering masses of germ and the bran, which latter are conveyed to the second aspirator 11, where the lighter particles of bran and meal are separated from the stock. The residue is reduced in the fourth stand of rolls 12, with a corrugation of twelve to the inch, spirals of one inch, and a ratio of speed of two to one. The product is then passed through a drier 13 and is heated until the moisture is driven out of the stock and the starch particles become brittle and friable, care being taken not to use so high a temperature as to volatilize the oil in the germ. Driving the water out of the starch particles causes them to bolt more easily. The stock is then conveyed to the fourth reel 14, clothed with a twelve-mesh screen, making a further separation of the starch-meal from the germ and bran. The former is passed into the conveyer 5, while the latter product is passed through the third aspirator 15, and is further separated from the lighter particles. The residue is further reduced by passing through the fifth roller-mill 16, having rolls of sixteen corrugations to the inch, spirals of one inch, and a ratio of speed of two to one. It is then bolted in a reel 17, having a screen of sixteen meshes to the inch. The separated starch-meal is passed into the conveyer 5, while the tailings are passed through a fourth aspirator 18, where the lighter particles are carried away. The residue is then conveyed into the sixth roller-mill 19, having rolls of eighteen corrugations to the inch, spirals of one inch, and a ratio of speed of two to one, where it is further reduced. From there it is passed through the second drier 20 and is heated until all of the remaining moisture is driven out of the starch particles and the germ. It is then passed through the sixth reel 21, having a screen of eighteen meshes to the inch. The water being extracted causes the adhering particles of meal to separate, become light, and to pass through the screen or bolting-cloth readily, leaving the germ and bran free from the starch particles, the latter passing into the conveyer 5. The germ and bran product is then passed through the fifth aspirator 22 and freed of the cornmeal-dust. The residue is then passed through a mill 23 and then through the seventh reel 24, having a screen of twenty meshes to the inch, where the bran is completely separated from the germ and passed into the conveyer 5 or otherwise disposed of. The germ is conveyed to the seventh roller-mill 25, having smooth rolls with a ratio of speed of two to one, where it is completely reduced or pulverized and is finished ready for the extraction of corn-oil. It is then stored in a bin 26 or otherwise disposed of. The starch particles practically free from the oily germ are collected at a suitable point by the conveyer 5 to be used in the arts.

I claim—

The process, substantially as herein described, of separating the germ from corn, which consists in, steaming the grain, passing it, successively, through several series of roller-mills, reels, and aspirators, reducing the particles of grain in each series, reducing the size of the screenings in each series, separating out the starch particles progressively as screenings, collecting the several screenings in common, drying the stock near the middle of the process, and again toward the end of it, separating out the starch particles completely from the bran and germ, reducing the bran and germ, then separating the germ from the bran, and finally reducing the germ.

JOHN FLETCHER PHILLIPS.

Witnesses:
 H. L. MILLER,
 WM. FIELDER.